Dec. 27, 1960 L. J. FOGEL 2,966,549

APPARATUS FOR IMPROVING INTELLIGENCE UNDER HIGH AMBIENT NOISE LEVELS

Filed April 2, 1954 2 Sheets-Sheet 1

INVENTOR,
LAWRENCE J. FOGEL

BY Harry M. Saragovitz

ATTORNEY.

Dec. 27, 1960 L. J. FOGEL 2,966,549

APPARATUS FOR IMPROVING INTELLIGENCE UNDER HIGH AMBIENT NOISE LEVELS

Filed April 2, 1954 2 Sheets-Sheet 2

INVENTOR.
LAWRENCE J. FOGEL

United States Patent Office 2,966,549

Patented Dec. 27, 1960

2,966,549

APPARATUS FOR IMPROVING INTELLIGENCE UNDER HIGH AMBIENT NOISE LEVELS

Lawrence J. Fogel, 35—24 78th St., Jackson Heights, N.Y.

Filed Apr. 2, 1954, Ser. No. 420,763

2 Claims. (Cl. 179—1)

(Granted under Title 35, U.S. Code (1952), sec. 266)

The invention described herein may be manufactured and used by or for the Government for governmental purposes, without the payment of any royalty thereon.

This invention relates to noise cancellation systems and more particularly to a system for reducing the apparent noise level at a receiver by artificially introducing a noise cancelling signal in the receiver.

This high ambient noise level in certain types of modern vehicles is a very serious factor in the intelligibility of the intercommunication systems required for operation of these vehicles. This is especially true, for example, in aircraft where powerful motors are required which must be mounted on the aircraft itself and which bring the noise level above the threshold of pain in some cases. At this point no additional intelligible signal could be applied to the ear in a normal manner.

A method of cancellation of the noise by sampling and retransmitting a noise energy cancelling signal through a loud speaker for each space would be an obvious solution to the problem but the phasing difficulties and variations in level from one point to another would make this impractical. Also, since the microphone or sound sampling device must operate at room level and the cancelling signal should be of approximately the intensity of the noise signal, oscillation or interference would be a serious problem and the solution is considered not entirely satisfactory.

In this invention the use of earphones is presumed. The sampling point is in the proximity of the earphones and the compensating signal can be applied within the earphones at a substantially lower level than that of the noise and with no danger of feedback.

It is therefore an object of this invention to provide a noise cancelling system.

It is a further object of this invention to provide a noise cancelling system for use in connection with headphones and microphones.

It is a further object of this invention to provide a noise cancelling system wherein the equivalent of the noise level at the ear of the receiver is applied electronically to the diaphragm of the receiver or is added within the electronic circuitry of an earphone or microphone to cancel the effect of the noise apparent to the ultimate listener in either case.

Other and further objects of this invention will become apparent from the following specification and the drawings which show typical arrangements of elements, according to the teachings of this invention, in block diagram form.

Figure 1:
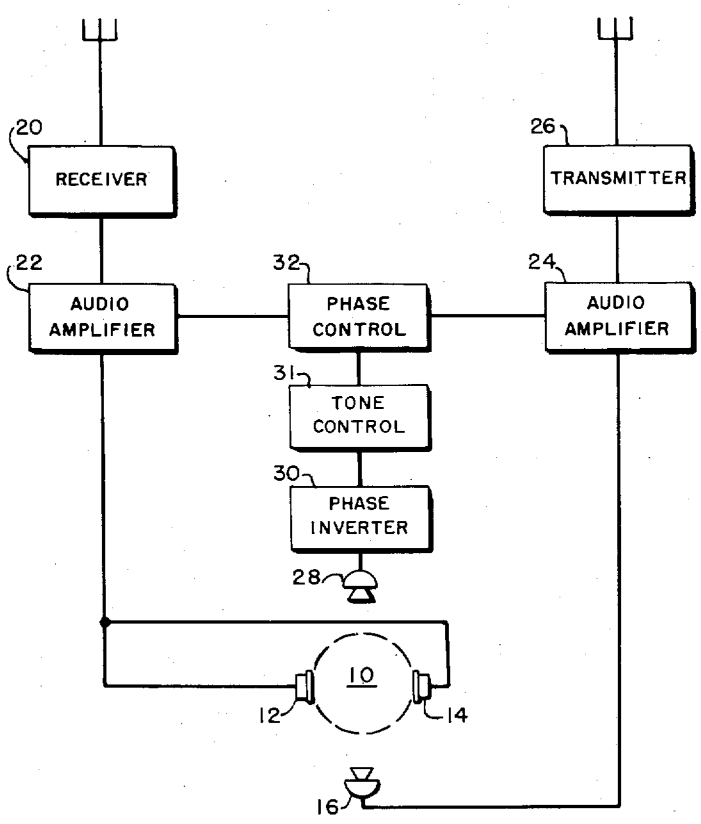

Referring more particularly to Fig. 1, a listener 10 is situated in a field of high ambient noise through which communication is desirable. He has earphones 12 and 14 to hear signals transmitted from remote points by radio or other electronic means. The noise of this place, however, reaches his eardrum through the earphone structure itself, past the gaps between the earphone and the head of the listener or by bone conduction through the head. This noise level, while substantially reduced by the damping effect of the earphones, may still be excessive and will inherently reduce the intelligibility of the received signal which may already be of poor intelligibility due to natural limitations of the radio or wire transmission systems and the basic distortions of amplifiers and electro-mechanical transducers.

The signal to be applied to the earphones 12 and 14 is detected in receiver 20, and passed through audio amplifier 22 to bring it up to the desired level for proper reception. The listener 10 is also provided with a microphone 16 that generates a signal which is amplified in 24 to be transmitted by 26. In ground communications from a fixed point it would be obvious that receiver and transmitter 20 and 26 could be replaced by wire systems of one kind or another.

The noise level in the immediate vicinity of the listener is sampled by a second microphone 28, preferably omnidirectional, which translates the noise energy to electrical energy for phase inversion in circuit 30. The inverted signal may be passed through a tone control 31 and an additional phase control 32 and then applied in the amount necessary and at the correct phase relationship to both amplifiers 22 and 24.

In the case of the audio amplifier 22 an inverted signal produces a corresponding signal in the headphones to apply a cancelling pressure at the eardrum of the listener to substantially reduce, if not eliminate, the effect of the random noise there. In the case of microphone 16, the noise level as well as the voice signal provides electrical energy to the audio amplifier 24 for ultimate transmission. While the spoken signal may be quite intelligible to the remote listener and while the noise level may be reduced artificially by other means, the noise is still undesirable and should be eliminated as much as possible before its transmission. Accordingly, a noise signal from the phase control 32 may also be applied to the audio amplifier 24 at the correct phase and level to cancel as much as possible of the noise energy within the amplifier stage.

Although the same noise level is received in both the microphones 16 and 28 and either one could presumably be used to supply a noise cancelling signal in the receiver channel, the microphone 16 which is also carrying the voice cannot be relied on for noise cancelling since this would reduce or eliminate the voice component and cause some trouble. The microphoine 28, however, could be placed in almost any position with respect to the observer where it would not actually interfere with the microphone being used for transmitting a signal to an external point. The microphone 28 could even be integral with the microphone 16 if it were directed away from the user while the microphone 16 were directed towards him. Certain noise cancelling microphones are in fact based on this system but rely on acoustical energy rather than electronic inversion and cancellation. In practice the microphone 16 would be a lip or a throat microphone generally used in conditions of extreme noise and mechanically suited to the presumably rugged conditions of high ambient noise location.

It is also conceivable that a switch-circuit or relay might be included in the voice information transmission line from microphone 16 to permit elimination of microphone 28 from the system and yet retain the noise cancelling advantages under received signal conditions.

Figure 2:
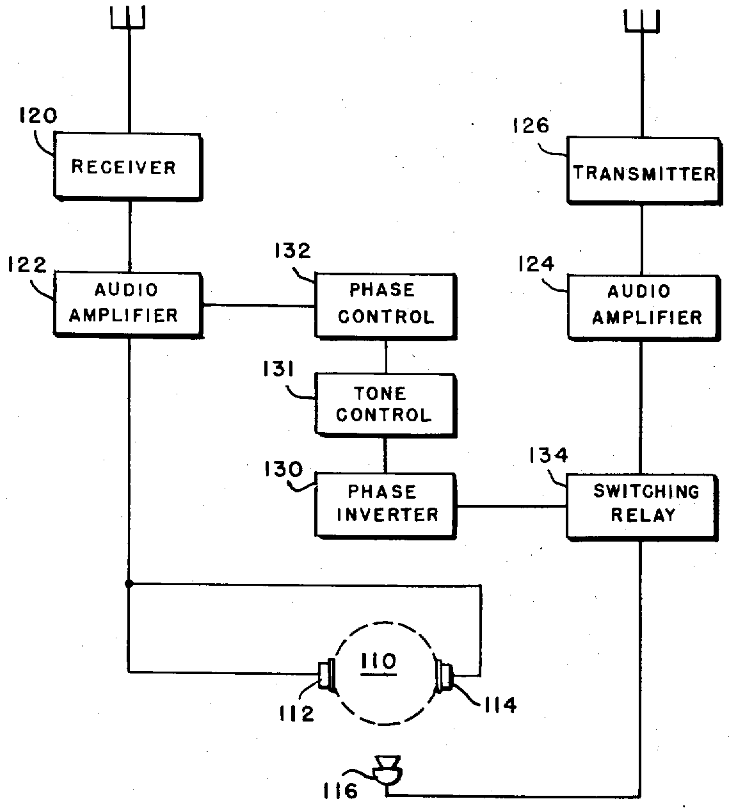

This is shown in Fig. 2 wherein the noise cancelling information is taken from microphone 116, passed through switching relay 134 and applied to the phase inverter 130 during reception. During transmission the signal reverts to transmitter 126 through its amplifier 124. Other elements of Fig. 2 are similar to the elements of Fig. 1.

This elimination of the ambient noise monitoring microphone 28 is particularly desirable where portability, weight or economy are major consideration. The function of microphone 28 is therefore performed by microphone 116 during the received time of operation. The switching circuit 134 is controlled by the transmitter key relay and in most transmitters may be furnished by a single wire. When the simplification technique is used by the voice transmitting microphone 116 functions continuously during the received-transmitted cycle.

Although in theory the phase inversion 30 would effectively compensate for the phase and amplitude for the signal at the ear, this is not quite true in practice because of certain differences in path length and the speed of sound in the various mechanical elements involved. An additional time correction of phase control 32 is considered necessary to synchronize the noise signal and the noise cancelling signal in the ear of the observer.

The cancelling frequencies need not be identical with the noise frequencies as pure theory might suggest. The reaction of high frequencies to environment is particularly uncertain in practice. They are quickly absorbed and easily deflected. The mechanical damping of the earphones alone reduces the high frequency noise much more than the low frequency noise. Also, the short wavelength of the high frequencies makes noise cancellation very critical as a function of time and distance. Therefore, the cancelling frequencies can be limited to or concentrated at the low frequency range by means of a tone control 31, relying on the mechanical filtering of the earphones for the high frequencies as a supplement to the direct cancellation.

Having thus described my invention, what is claimed is:

1. A sound receiving and transmitting system for use under random noise conditions comprising: a pair of earphones, a first microphone, a first audio amplifier having two inputs and a common output, said output of said first audio amplifier connected to said earphones, a second audio amplifier having two inputs and a common output, one of said inputs of said second audio amplifier being connected to said first microphone, a second microphone for receiving the noise in the general proximity of said earphones and said first microphone, electronic means being connected to said second microphone for controlling the amplitude, phase, and frequency response of said second microphone, said electronic means having a first output connected to one of said inputs of said first audio amplifier and said electronic means having a second output connected to the other of said inputs of said second audio amplifier.

2. In a system for cancelling the local noise interfering with voice signals being transmitted and reproduced electrically, a first amplifier having two inputs and a common output, a source of intelligence signals connected to one of said inputs, a pair of headphones connected to said common output, a second amplifier having two inputs and a common output, a transmitter connected to said common output, a first microphone positioned to pick up voice signals connected to one of the inputs of said second amplifier, a second microphone positioned to pick up the interfering local noise signals, a phase control and amplifier circuit, having two outputs and an input connected to said second microphone, one of the outputs of said phase control being connected to the other of the inputs of said first amplifier and the other of the outputs of said phase control being connected to the other of said inputs of said second amplifier.

References Cited in the file of this patent

UNITED STATES PATENTS

| | | |
|---|---|---|
| 2,043,416 | Lueg | June 9, 1936 |
| 2,338,551 | Stanko | Jan. 4, 1944 |
| 2,350,010 | Beekley | May 30, 1944 |
| 2,756,328 | Braak | July 24, 1956 |